(12) United States Patent
Giust

(10) Patent No.: US 8,891,602 B1
(45) Date of Patent: Nov. 18, 2014

(54) ANALYZING JITTER WITH NOISE FROM THE MEASUREMENT ENVIRONMENT

(76) Inventor: Gary K. Giust, Santa Clara, CA (US)

( * ) Notice: Subject to any disclaimer, the term of this patent is extended or adjusted under 35 U.S.C. 154(b) by 213 days.

(21) Appl. No.: 13/459,763

(22) Filed: Apr. 30, 2012

Related U.S. Application Data

(60) Provisional application No. 61/487,832, filed on May 19, 2011.

(51) Int. Cl.
*H04B 3/46* (2006.01)
*H04B 17/00* (2006.01)
*H04Q 1/20* (2006.01)

(52) U.S. Cl.
USPC .......................................... 375/224; 375/226

(58) Field of Classification Search
CPC ..... H04L 1/205; H04L 1/24; G01R 31/31709
USPC ................................................. 375/224, 226
See application file for complete search history.

(56) References Cited

U.S. PATENT DOCUMENTS

| | | | |
|---|---|---|---|
| 5,107,849 A | 4/1992 | Bellin et al. |
| 6,137,283 A | 10/2000 | Williams et al. |
| 6,263,290 B1 | 7/2001 | Williams et al. |
| 6,298,315 B1 | 10/2001 | Li et al. |
| 6,356,850 B1 | 3/2002 | Wilstrup et al. |
| 6,529,842 B1 | 3/2003 | Williams et al. |
| 6,671,334 B1 | 12/2003 | Kuntz et al. |
| 6,795,496 B1 | 9/2004 | Soma et al. |
| 6,799,144 B2 | 9/2004 | Li et al. |
| 6,832,172 B2 | 12/2004 | Ward et al. |
| 6,853,933 B2 | 2/2005 | Tan et al. |
| 6,898,535 B2 | 5/2005 | Draving |
| 7,043,393 B2 | 5/2006 | Fuller, III et al. |
| 7,050,923 B2 | 5/2006 | Fuller, III et al. |
| 7,254,168 B2 | 8/2007 | Guenther |
| 7,339,984 B1 | 3/2008 | Daou |

(Continued)

FOREIGN PATENT DOCUMENTS

EP  1 504 271 B1  11/2006
EP  1 508 813 B1  1/2007

OTHER PUBLICATIONS

Analui, "Data Dependent Jitter in Serial Communications," IEEE Transactions on Microwave Theory and Techniques, vol. 53, No. 11, p. 1, Nov. 2005.

(Continued)

*Primary Examiner* — Tanmay Shah
(74) *Attorney, Agent, or Firm* — Miller Patent Services; Jerry A. Miller

(57) ABSTRACT

An apparatus and method for receiving a signal waveform representing a signal-under-test (SUT), and a noise waveform representing noise measured in the absence of the SUT. An environment waveform is derived from the noise waveform and the signal waveform, and a jitter spectrum is computed from the environment waveform. An environment spur is detected, where the environment spur includes a spur in the jitter spectrum of the environment waveform. A jitter spectrum of the signal waveform is computed, and one or more signal spurs are detected, where the one or more signal spurs include one or more spurs in the jitter spectrum of the signal waveform. A measure of jitter for the SUT is derived from the one or more signal spurs after reducing the presence of at least one of the one or more signal spurs in response to detecting the environment spur.

23 Claims, 9 Drawing Sheets

(56) References Cited

U.S. PATENT DOCUMENTS

| | | | |
|---|---|---|---|
| 7,386,409 | B2 | 6/2008 | Mueller et al. |
| 7,388,937 | B1 | 6/2008 | Rodger et al. |
| 7,450,043 | B2 | 11/2008 | Pupalaikis |
| 7,720,660 | B2 | 5/2010 | Bolcato et al. |
| 2003/0130830 | A1 | 7/2003 | Gist et al. |
| 2004/0205556 | A1 | 10/2004 | Abramovitch |
| 2004/0210790 | A1 | 10/2004 | Moon et al. |
| 2005/0218881 | A1 | 10/2005 | Tanaka et al. |
| 2005/0232345 | A1 | 10/2005 | Ward et al. |
| 2005/0243950 | A1 | 11/2005 | Laquai et al. |
| 2005/0246113 | A1 | 11/2005 | Montijo |
| 2006/0045175 | A1 | 3/2006 | Draving et al. |
| 2006/0045226 | A1 | 3/2006 | Li et al. |
| 2006/0251200 | A1 | 11/2006 | Miller |
| 2007/0150218 | A1 | 6/2007 | Akimoto |
| 2009/0052511 | A1* | 2/2009 | Wu ............... 375/226 |

OTHER PUBLICATIONS

Anonymous, "10 Gigabit Ethernet Consortium XAUI Electrical Test Suite, Version 1.1" Dec. 28, 2004.

Anonymous, "Advanced Jitter, Noise and BER Analysis Software for TDS/CSA8000 Series Sampling Oscilloscopes," Tektronix Datasheet, Updated Jul. 2005.

Anonymous, "Agilent E5052B Signal Source Analyzer 10 MHz to 7 Ghz, 26.5 Ghz, or 110 Ghz Data Sheet," Agilent Technologies, Mar. 11, 2009.

Anonymous, "Agilent PSA Series Spectrum Analyzers Data Sheet," Agilent Technologies, Nov. 15, 2008.

Anonymous, "Agilent Technologies InfiniiVision 6000L Series Low-Profile Oscilloscopes," Agilent Technologies Data Sheet, Feb. 28, 2010.

Anonymous, "Analysis Software for Oscilloscopes, 80SJARB and 80SJNB Data Sheet," Tektronix Datasheet, Updated Aug. 5, 2009.

Anonymous, "Common Electrical I/O (CEI)—Electrical and Jitter Interoperability Agreements for 6G+ bps and 11G+ bps I/O," Optical Internetworking Forum (OIF), IA #OIF-CEI-02.0, Feb. 28, 2005.

Anonymous, "Converting Phase Noise (dBc/Hz) to Phase Jitter (ps RMS) for Large Data Sets," JitterTime Consulting, © 2006-2009.

Anonymous, "Infiniium 90000 Series Oscilloscopes Data Sheet," Agilent Technologies, Oct. 1, 2009.

Anonymous, "Infiniium 9000 Series Oscilloscopes," Agilent Technologies Datasheet, Document 5989-7819EN, Feb. 9, 2010.

Anonymous, "Infiniium DCA-J Agilent 86100C Wide-Bandwidth Oscilloscope Mainframe and Modules, Technical Specifications," Agilent Technologies, Apr. 23, 2010.

Anonymous, "INF-8077i 10 Gigabit Small Form Factor, Pluggable Module," SFF Committee, Rev. 4.5, Aug. 31, 2005.

Anonymous, "MtronPTI's Oscillator Jitter Basics," MtronPTI, p. 1, ebook published on ebookbrowse, Nov. 12, 2010.

Anonymous, "N5410A Fibre Channel Compliance Application for Infinium Series Oscilloscopes," Agilent Technologies Datasheet, Document 5989-6151EN, Oct. 1, 2009.

Anonymous, "N5431A XAUI Electrical Validation Application for Infiniium Oscilloscopes and Digital Signal Analyzers," Agilent Technologies Datasheet, Document 5989-6151EN, Jun. 11, 2008.

Anonymous, "Physical Medium Dependent Sublayer and Baseband Medium, Type 10GBASE-KR," IEEE 802.3-2008 Clause 72, pp. 417-451, 2008.

Anonymous, "RabidIO Part 6: LP-Serial Physical Layer Specification Rev. 2.0," RapidIO Trade Association, Rev. 2.0.1, Chapter 8, pp. 187-228, 2008.

Anonymous, "SFF-8431 Specifications for Enhanced Small Form Factor Pluggable Module SFP+," SFF Committee, Rev. 4.1, Jul. 6, 2009.

Anonymous, "Synchronous Optical Network (SONET) Transport Systems: Common Generic Criteria," Telcordia, GR-253_CORE, Issue 4, Dec. 2005.

Anonymous, "Understanding and Characterizing Timing Jitter," Figure 4.2, p. 13, Tektronix, Inc., 2003.

Anonymous, "XGMII Extender Sublayer (XGXS) and 10 Gigabit Attachment Unit Interface (XAUI)," IEEE 802.3-2008 Clause 47, pp. 211-223, 2008.

Guist, Gary, "Added Resistor Preserves Crystal Oscillator's Low Output Jitter," Planet Analog, Jun. 17, 2007.

Guist, Garym "Jitter Peaking and PLLs," Signal Integrity, Sep. 13, 2007.

Guist, Gary, "Setting Up Your Oscilloscope to Measure Jitter," Signal Intergrity, Oct. 11, 2007.

Ham, Bill, "Fibre Channel—Methodologies for Jitter and Signal Quality Specification—MJSQ," T11.2/Project 1316-DT/REV 14.1, Jun. 5, 2005.

Anonymous, "Preventing and Attacking Measurement Noise Problems," White Paper, Campbell Scientific, Inc., 2001.

Anonymous, "Spectral Analysis Using a Deep-Memory Oscilloscope Fast Fourier Transform (FFT)," Application Note, Agilent Technologies, 2001.

Andrews, James R., "Removing Jitter from Picosecond Pulse Measurements," Picosecond Pulse Labs, Sep. 2009.

Anonymous, "Evaluating Oscilloscope Vertical Noise Characteristics," Application Note, Agilent Technologies, Oct. 1, 2009.

* cited by examiner

US 8,891,602 B1

ANALYZING JITTER WITH NOISE FROM THE MEASUREMENT ENVIRONMENT

CROSS REFERENCE TO RELATED DOCUMENTS

This application claims priority benefit of 61/487,832 filed May 19, 2011 which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The accuracy of an electrical measurement may be affected by the environment in which the measurement is made. Ground loops, vibration, temperature drifts, electrical crosstalk, thermal noise, shot noise, flicker noise, electromagnetic radiation, and test-equipment noise are examples of noise that may be present in the environment during a measurement that can alter, distort, or interfere with a desired signal to obscure its useful information. The measurement equipment itself can be a source of noise in the environment that is measured along with the desired signal. Achieving accurate measurement results may become more difficult as the strength of the signal to be measured decreases, particularly in the presence of an influential environment.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 5 as referred to herein incorporates FIGS. 5A and 5B.

FIG. 7 as referred to herein incorporates FIGS. 7A and 7B.

DETAILED DESCRIPTION

Figure 1:
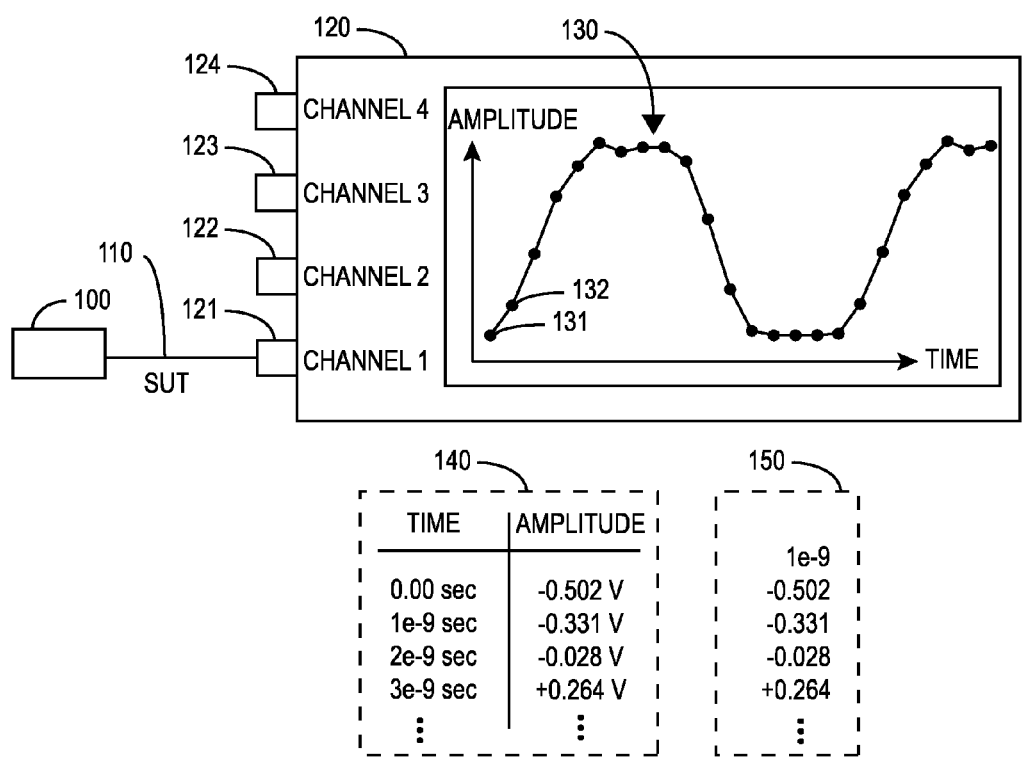
FIG. 1 depicts an example measurement of a signal waveform in accordance with certain embodiments consistent with the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. Nothing in this document is intended to be construed as an admission of prior art unless explicitly designated as such using the words "prior art".

Reference throughout this document to "one embodiment", "certain embodiments", "an embodiment", "an example", "an implementation" or similar terms means that a particular feature, structure, or characteristic described in connection with the embodiment, example, or implementation is included in at least one embodiment, example, or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples, or implementations without limitation.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, a script, a program module, an object implementation, a script, a program module, an executable application, an applet, a servlet, a source code, an object code, a shared library/dynamic load library and/or other sequence of instructions designed for execution on a computer system. The term "processor", "controller", "CPU", "computer" and the like as used herein encompasses both hard programmed, special purpose, general purpose and programmable devices and may encompass a plurality of such devices or a single device in either a distributed or centralized configuration without limitation.

The use of terminology herein for first, second, and third to describe an element is to be merely interpreted as a label, and does not imply timing or other specific attributes. The term "or" as used herein is to be interpreted as an inclusive or meaning any one or any combination. Therefore, "A, B or C"

means "any of the following: A; B; C; A and B; A and C; B and C; A, B and C". An exception to this definition will occur only when a combination of elements, functions, steps or acts are in some way inherently mutually exclusive.

The subject matter disclosed herein relates generally to methods and apparatuses for analyzing a signal, and specifically to methods and apparatuses for analyzing jitter in a signal derived from an electronic device.

The term "signal" is used herein to describe a continuous-time signal, such as a real-world signal. In a mathematical abstraction, the domain of a continuous-time signal is the set of real numbers (or some interval thereof). The terminology "analog property of a signal" as used herein therefore includes any attribute, quality, or characteristic of the signal that can express any value along a continuous scale (or some interval thereof). The signal may include small fluctuations that are meaningful. Some analog properties of a signal may include phase noise, jitter, and spectral density.

The term "electronic device" is used herein to describe a physical device that utilizes the properties of electrons for accomplishing in whole or in part its purpose. An electronic device may additionally utilize light, such as in optoelectronic (optical transceiver modules) and electro-optic (e.g. image sensors) devices; sound, such as in surface-acoustic wave (SAW)-based clock oscillator devices; or mechanical motion, such as in micro-electro-mechanical (MEMS)-based clock oscillator devices or other physical phenomenon. Electronic devices well suited for this application include without limitation integrated circuits (ICs), semiconductor chips, packaged semiconductor chips, electronic components and modules, transceivers, transponders, serializers and deserializers (e.g. SERDES), clock timing sources, signal (e.g. pulse, pattern, data) sources, electronic systems and components of such systems, printed circuit boards (PCBs), and PCB assemblies.

The term "noise", or interference, is used herein to describe an undesirable signal or a set of undesirable signals that may alter, disturb, or interfere with an original (or desired) signal. An analog property of a signal can become increasingly difficult to accurately measure and analyze as the amplitude of noise in the signal approaches a significantly large percentage of the signal amplitude. Noise may be introduced from the environment during measurement (e.g. ground loops, crosstalk, electrical and magnetic fields, etc.). Also, the environment includes the measurement equipment itself, which can introduce artifacts into the measured data that can be erroneously interpreted as signal if not properly accounted for.

The term "waveform" is used herein to represent the shape of a signal moving in a physical medium or an abstract representation. An electronic measurement device such as a real-time sampling oscilloscope can be used to capture a portion of a signal as a waveform made up of a plurality of samples, each sample representing an amplitude of the signal at a corresponding sample time. The real-time sampling oscilloscope may save the waveform in memory as a set of values, and/or may display the waveform on a screen as a graph of amplitude versus time.

The spectrum, or frequency spectrum, of a time-domain signal generally refers to a representation of that signal in the frequency domain. The spectrum may be derived from the time-domain signal using, for example, a Fourier transform, such as a discrete Fourier transform (DFT) or a fast-Fourier transform (FFT). The spectrum may be presented as a graph of an amount versus frequency, where the amount may be quantified, for example, as amplitudes, phases, magnitudes, or powers. The amount may be an instantaneous or average amount.

The spectrum may include spurious signals or spurious noise, sometimes referred to as simply "spurs", that are visible as distinct spikes in a graph of the amount versus frequency (i.e., the frequency spectrum). Such spurs may offer insight into the mechanisms that created the signal. For example, these spurs may relate to signal harmonics, electronic crosstalk, electromagnetic pollution, mechanical vibrations (e.g. microphonics), and/or power-supply surges. The spurs may be inherent to the signal and/or added to the signal from one or more noise sources during the measurement. Understanding the source of these spurs may help to eliminate them.

The scope of this application relates to data signals and clock timing signals. A data signal may carry information primarily in its levels; a clock timing signal may carry information primarily in its edges (clock transitions). Clock timing signals are generally discussed throughout this application for illustrative purposes, but should not be interpreted as limiting unless specified within a claim.

In general, a two-state clock timing signal oscillates between a high-level state and low-level state, and the time between recurring edges of the clock timing signal is often periodic or pseudo-periodic. The clock timing signal has edges with a rising slope direction, and edges with a falling slope direction, and these edges may be used to control the timing of actions. For many applications, the clock timing signal is ideally a periodic wave such as a sine wave, a square wave, or a stream of pulses. In practice, the clock timing signal may contain characteristics that make the waveform imperfect and therefore is referred to herein as "pseudo-periodic", with such imperfections including variations in time of amplitude, pulse width, period, frequency, rise time, or fall time, for example. Furthermore, some imperfections are sometimes intentionally introduced onto the clock timing signal. For example, spread-spectrum technology introduces a controlled amount of frequency modulation onto the clock timing signal to minimize electro-magnetic interference (EMI) emissions. The clock timing signal is frequently used to define a time reference for the movement of data within a system.

The clock timing signal is generally derived from a clock timing source. The following are non-limiting examples of clock timing sources that may output at least one clock timing signal: crystal oscillator (XO), voltage-controlled oscillator (VCO), voltage-controlled crystal oscillator (VCXO), voltage-controlled surface-acoustic wave (SAW) oscillator (VCSO), oven-controlled crystal oscillator (OCXO), temperature-controlled crystal oscillator (TCXO), programmable clock oscillator, phase locked loop (PLL)-based clock synthesizer, fractional-N clock synthesizer, SAW oscillator, micro-electro-mechanical systems (MEMS) oscillator, temperature-compensated MEMS oscillator (TCMO), clock-recovery unit (CRU), clock-generation integrated circuit (IC), distribution-buffer IC, jitter-attenuation IC, frequency-translation IC, clock-multiplier IC, spread-spectrum clock IC, clock IC, clock module, clock circuit, and a semiconductor chip that outputs the clock timing signal.

Jitter may be described as the variation of a timing event. Some types of jitter include: time-interval error (TIE) jitter, period jitter, cycle-to-cycle jitter, half-period jitter, and N-cycle jitter. TIE jitter may be defined as the short-term variation of the significant instants of a digital signal from their ideal positions in time; period jitter may be defined as the variation of a period in a signal from its mean period; cycleto-cycle jitter may be defined as the variation in period between two adjacent cycles in a signal; half-period jitter may be defined as the variation of any half-period in a signal from its mean half-period; and N-cycle jitter may be defined as the variation between two edges in a signal that are N-cycles apart. Other types of jitter also exist. Note that since no universally accepted standard exists for jitter terminology, the above terminology and/or definitions for types of jitter may differ from that found in the literature and/or technical standard, for example, depending on the source of the literature and/or technical standard. Hence, the terminology itself may introduce confusion in interpretation if one is not careful to understand the underlying phenomenon being discussed, and caution in assuring a clear understanding of the actual type of jitter is urged.

Additionally, each type of jitter may be decomposed into one or more statistical components of jitter. Example statistical components of jitter include:
- a random component of jitter, also referred to as random jitter (RJ);
- a deterministic component of jitter, also referred to as deterministic jitter (DJ);
- a periodic component of jitter, also referred to as periodic jitter (PJ);
- a data-dependent component of jitter, also referred to as data-dependent jitter (DDJ) or inter-symbol interference (ISI) jitter;

The RJ may be created by random noise and characterized by a Gaussian distribution. The DJ may be created by system mechanisms (such as crosstalk, reflections, loss) and/or bandwidth limitations (such as ISI) and characterized by a distribution that is bounded in time. The DJ may include PJ, and DDJ. The PJ may be described as jitter that repeats in a cyclical fashion, and when associated with a serial-data signal, may be uncorrelated to the serial-data bit pattern. The DDJ may describe the time differences required for a signal to arrive at a receiver threshold when starting from different places in bit sequences. As mentioned above, since jitter terminology is not universally standardized, the above terminology and/or definitions for the statistical components of jitter may differ from that found in the literature and/or technical standard, for example, depending on the source of the literature and/or technical standard. Other statistical components of jitter also exist.

Certain example mechanisms by which the embodiments herein benefit providing an analysis of jitter in a signal are described below with reference to FIGS. 1 through 10.

Referring to FIG. 1, an example electronic device 100 (as described above) is shown to output a signal (as described above) to be measured by a test apparatus. The signal from which a measurement is derived is referred to herein as a signal-under-test (SUT) 110. The SUT 110 may have been transmitted using any suitable signaling type, such as transistor-transistor logic (TTL), low-voltage TTL (LVTTL), stub series terminated logic (SSTL), complementary metal-oxide-semiconductor (CMOS), low-voltage CMOS (LVCMOS), emitter-coupled logic (ECL), positive ECL (PECL), low-voltage PECL (LVPECL), low-voltage differential signaling (LVDS), current-mode logic (CML), and high-speed transceiver logic (HSTL) or others without limitation. The test apparatus shown in FIG. 1 may be a real-time sampling oscilloscope 120 (also called a digital storage oscilloscope). The real-time sampling oscilloscope 120 is shown in FIG. 1 to have four channels with corresponding inputs 121-124. The SUT 110 enters the real-time sampling oscilloscope 120 through Channel 1 at input 121.

The SUT 110, which is analog in nature, may be optical or electrical, single-ended or differential. The SUT 110 may be, for example, a clock timing signal (e.g. sine wave or square wave), or a digital data signal. The electronic device 100 provides the SUT 110 through an output that may exist in the form of a standard or custom electrical or optical connector (e.g. BNC, SMA, triax, RJ45, Infiiniband, CX4, fiber-optic LC or SC connector), or connect to a physical probe. The output may be from an electronic device such as an integrated circuit (IC); a semiconductor chip; a packaged semiconductor chip; a printed circuit board (PCB); a PCB assembly; an electrical device, component or module; an optical transceiver; an optical transponder; a clock timing source (as discussed above); a test instrument; a serializer or deserializer (e.g. SERDES); a signal (e.g. pulse, pattern, data) source; or an electronic system or sub-system. The SUT 110 may be accessed by attaching a physical probe from a test instrument to a suitable electrical contact point of the electronic device 100.

The example real-time sampling oscilloscope 120 incorporates sampling hardware to convert a portion of the SUT 110 into a time-domain signal waveform 130 having a first plurality of samples, each sample representing an amplitude of the SUT 110 at a corresponding sample time. Two of this first plurality of samples are illustrated in FIG. 1 as 131 and 132 (the straight-line segments connecting the first plurality of samples in FIG. 1 are merely intended as an illustrative aid). The real-time sampling oscilloscope 120 may store the signal waveform 130 in memory as a series 140 of amplitudes and corresponding time values. Alternatively, to save memory, the signal waveform 130 may be stored in memory as a series 150 of amplitudes plus a time-increment value (e.g. 1E-9). FIG. 1 illustrates a signal waveform 130 resulting from sampling a SUT 110 at a rate of one Giga-samples per second (e.g. one sample is acquired every 1E-9 seconds). For example, the first amplitude sample 131 is represented by −0.502V captured at 0 seconds; the second amplitude sample 132 is represented by −0.331V captured at 1E-9 seconds; and so on. Other ways of storing the signal waveform 130 are also possible. The signal waveform 130 may be displayed on a screen of the real-time sampling oscilloscope 120 as a graph of amplitude versus time, or in tabular form.

Figure 2:
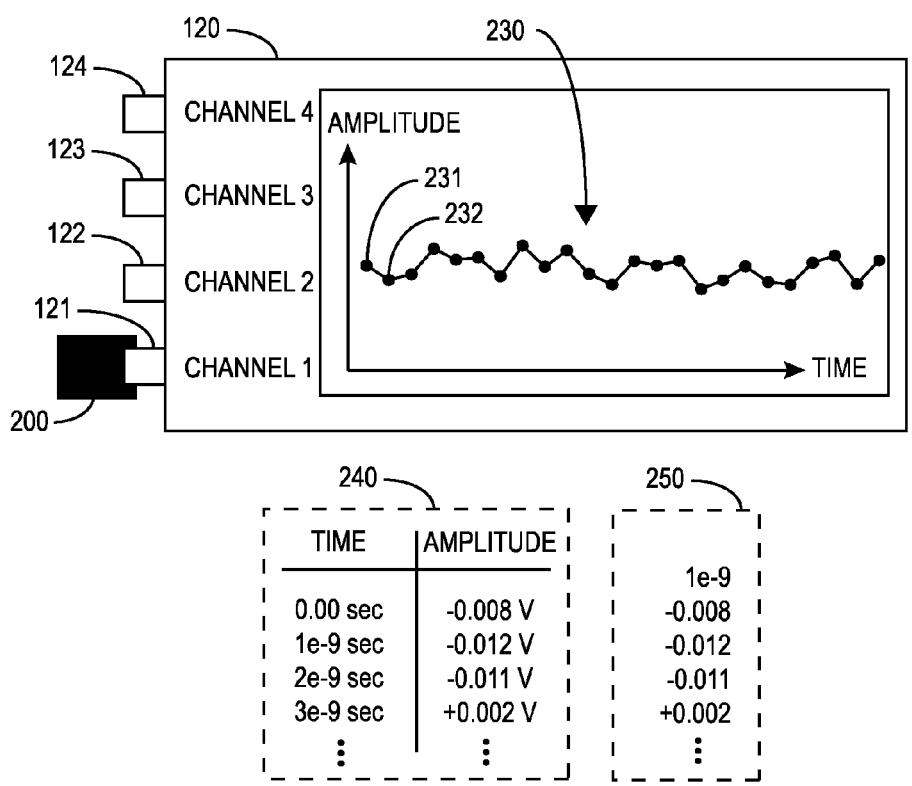
FIG. 2 depicts an example measurement of a noise waveform in accordance with certain embodiments consistent with the present invention.

FIG. 2 illustrates a similar setup for acquiring a waveform, where the electronic device 100 has been replaced by an example terminator 200 attached to input 121 of the real-time sampling oscilloscope 120. The terminator 200 may be used to match the real-time sampling oscilloscope's impedance (for example, 50 or 75 Ohms) looking into input 121, thereby reducing signal reflections. The terminator 200 may be passive such as a simple resistor. The terminator may be active such as a voltage regulator that keeps the voltage across one or more terminating resistors constant. The terminator 200 may be electrical ground. Other terminator configurations are also possible. The terminator 200 may attach to an interface accessible externally on the real-time sampling oscilloscope 120. Alternatively, the terminator 200 may be located inside the real-time sampling oscilloscope, and may be electronically enabled and disabled. Preferably, terminator 200 itself produces minimal noise and is suitably shielded and isolated from the environment so as to not unduly contribute to the measurement depicted by FIG. 2.

Since the SUT 110 is absent to the measurement illustrated by FIG. 2, the signal observed by the real-time sampling oscilloscope 120 represents a noise signal, or noise (for example, from the point of view of the SUT 110). In this way, a noise waveform 230 may be acquired by the real-time sampling oscilloscope 120, representing noise present in the measurement environment. This noise may include noise generated by the test apparatus, such as the real-time sampling oscilloscope 120, as well as noise generated external to the test apparatus, such as cell-phone activity, that penetrates into the real-time sampling oscilloscope 120 to be present during measurement of the noise waveform 230.

The real-time sampling oscilloscope 120 converts a portion of the noise into a noise waveform 230 having a second plurality of samples, each sample representing an amplitude of the noise at a corresponding sample time. Two of this second plurality of samples are illustrated in FIG. 2 as 231 and 232 (the straight-line segments connecting the second plurality of samples in FIG. 2 are merely intended as an illustrative aid). The real-time sampling oscilloscope 120 may store the noise waveform 230 in memory as a series 240 of measured amplitudes and corresponding time values. Alternatively, to save memory, the noise waveform 230 may be stored in memory as a series 250 of measured amplitudes plus a time-increment value (e.g. 1E-9). FIG. 2 illustrates a time domain noise waveform 230 resulting from sampling noise at a rate of one Giga-samples per second (e.g. one sample is acquired every 1E-9 seconds). For example, the first amplitude sample 231 is represented by −0.008V captured at 0 seconds; the second amplitude sample 232 is represented by −0.012V captured at 1E-9 seconds; and so on. Other ways of storing the noise waveform 230 are also possible. The noise waveform 230 may be displayed on a screen of the real-time sampling oscilloscope 120 as a graph of amplitude versus time, or in tabular form. The noise waveform 230 may be measured using the real-time sampling oscilloscope 120 with (as shown in FIG. 2) or without (e.g. floating the input 121) the terminator 200 attached to the real-time sampling oscilloscope 120, depending on the desired application.

FIGS. 3 through 7 describe certain illustrative embodiments for analyzing jitter in a signal when at least one noise source appearing as a spur in the noise waveform's 230 jitter spectrum (that is, the frequency spectrum of jitter in the noise waveform 230) also appears as a spur in the signal waveform's 130 jitter spectrum. Any spur present in the noise waveform's 230 jitter spectrum may be considered as not derived from the SUT 110 since the SUT 110 is absent during measurement of the noise waveform 230. Such a spur may therefore be considered a measurement artifact. The mechanism in which the embodiments presented herein reduce this measurement artifact to increase measurement accuracy of jitter in the signal waveform 130 are discussed as follows.

Figure 3:
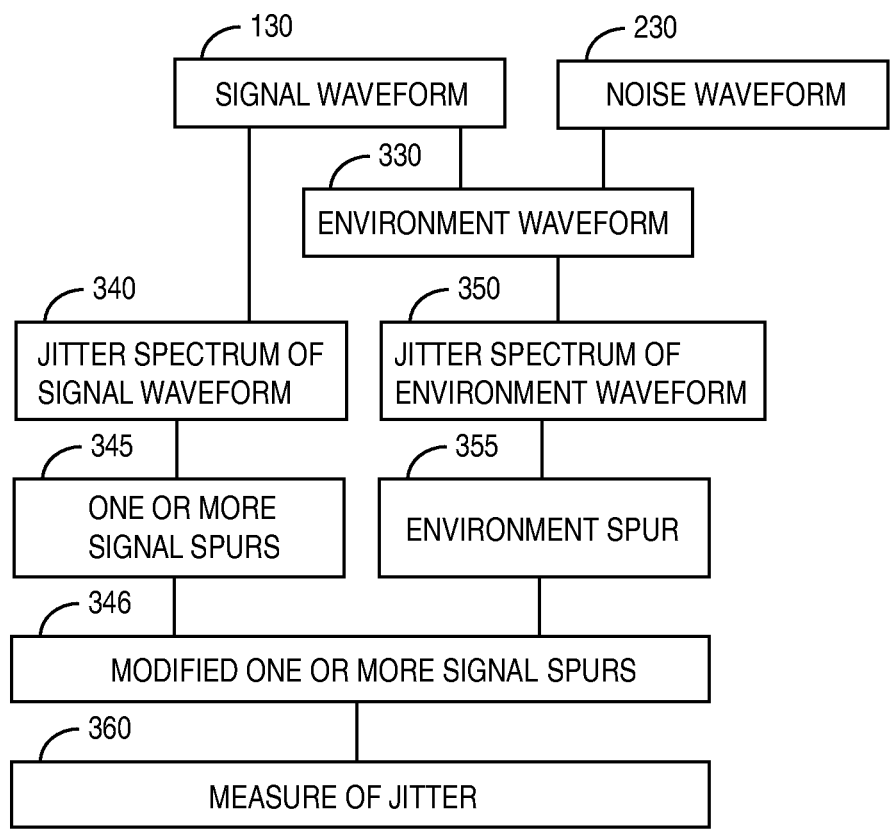
FIG. 3 is an example flow chart of a method in accordance with certain embodiments consistent with the present invention.

The example flow chart depicted in FIG. 3 depicts a process that begins by receiving the signal waveform 130 and the noise waveform 230. For example, these waveforms may be acquired by a real-time sampling oscilloscope 120 as described above in relation to FIGS. 1 and 2. That is, one or more illustrative embodiments begin by using a real-time sampling oscilloscope 120 to acquire a signal waveform 130 representing a SUT 110; and by using a real-time sampling oscilloscope 120 to acquire a noise waveform 230 representing noise measured by the real-time sampling oscilloscope 120 in the absence of the SUT 110. Alternatively these waveforms may be acquired by an analog-to-digital converter (ADC) unit, or other signal-sampling unit, alone or in combination with software and/or additional hardware.

Figure 4:
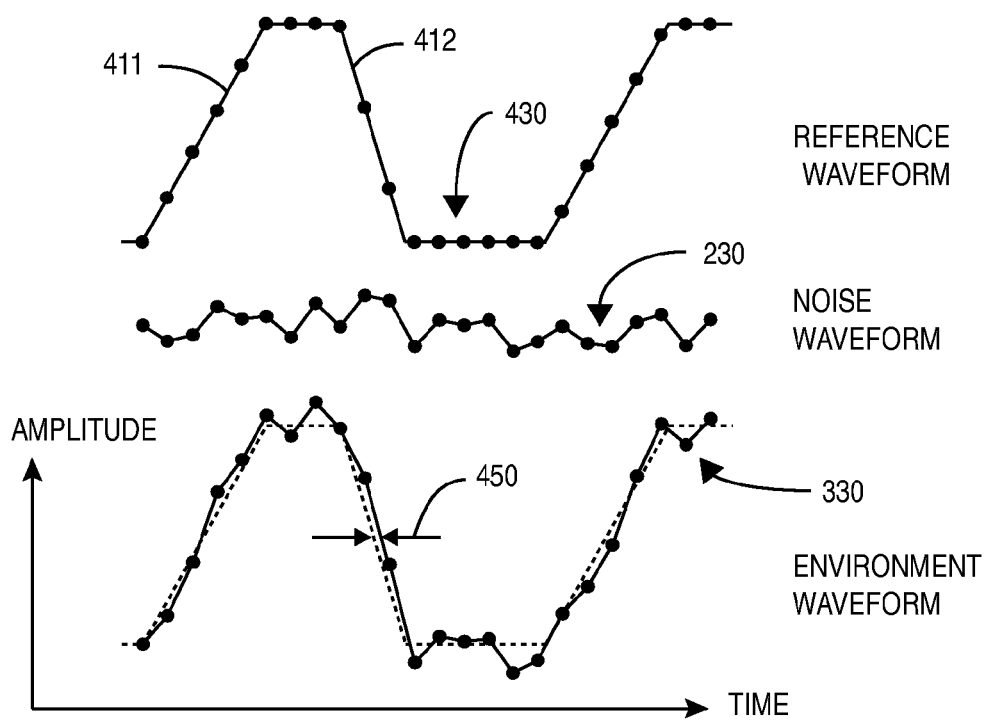
FIG. 4 depicts example reference, noise, and environment waveforms in accordance with certain embodiments consistent with the present invention.

An environment waveform 330 is derived from the noise waveform 230 and the signal waveform 130. The environment waveform 330 may be derived in various ways. One method is to generate a reference waveform 430 and add the noise waveform 230 to it, for example using the following equation as illustrated by FIG. 4.

Environment Waveform=Reference Waveform+Noise Waveform

The reference waveform 430 can be a periodic waveform. For a signal waveform 130 representing a data signal, an average interval such as an average unit interval of data (that is, an average duration of one bit) may be derived from the signal waveform and used to compute an ideal (for example, jitter free) reference waveform 430. For a signal waveform 130 representing a clock signal, an average interval such as one complete cycle or a half cycle may be used to compute an ideal (for example, jitter free) reference waveform 430.

The shape of the reference waveform 430 may be sinewave, square-wave, triangle-wave, or other shape. For example, as illustrated in FIG. 4, the rise-time of a rising edge 411 in the reference waveform 430 can be set to equal the average rise-time measured in the signal waveform 130. The fall-time of a falling edge in the signal waveform 130 may be different than the rise-time of a rising edge in the signal waveform 130. Thus, the fall-time of a falling edge 412 in the reference waveform 430 can be set to equal the average fall-time measured in the signal waveform 130. Alternatively, if the SUT 130 cyclically repeats, an average cycle or portion of an average cycle derived from the signal waveform 130 may be used to construct the reference waveform 430.

Another method for generating the environment waveform 330 from the noise waveform 230 and the signal waveform 130 is to process the signal waveform 130 using a software filter. For example, the filter may represent the jitter transfer characteristic of a phase-locked loop (PLL), or other device, such that the jitter present in the signal waveform 130 after passing through the device to produce the reference waveform 430 is attenuated according to a mathematical model appropriate for the intended application. As described above and illustrated in FIG. 4, the resulting reference waveform 430 may then be added to the noise waveform 230 to create the environment waveform 330.

The environment waveform 330 is intended to represent a jitter-free (or jitter-free for jitter frequencies of interest in the case of the software filter above) representation of the signal waveform 130 plus the noise waveform 230. The jitter of this environment waveform 330 may then be computed. This jitter may be interpreted as jitter present in the measurement environment (that is, not derived from the SUT 110). FIG. 4 illustrates a TIE jitter measurement 450 for a falling edge in the environment waveform 330. The dashed curve in FIG. 4 traces out the shape of the reference waveform 430 as an illustrative aid for visualizing the TIE jitter measurement 450. The TIE jitter measurement 450 may be assumed in this example to be for falling edges only in the signal waveform 130, and therefore the average location of the falling edge depicted by the dotted curve may serve as a reference edge for computing TIE jitter. Other types of jitter may be computed from the environment waveform. A jitter spectrum 350 of the environment waveform may then be computed. For comparison, jitter and a jitter spectrum 340 of the signal waveform may also be computed.

Referring again to FIG. 3, one or more signal spurs 345 may be detected, where the one or more signal spurs include spurs in the jitter spectrum 340 of the signal waveform. Similarly, an environment spur 355 may be detected, where the environment spur 355 includes a spur in the jitter spectrum 350 of the environment waveform.

Figure 5A:
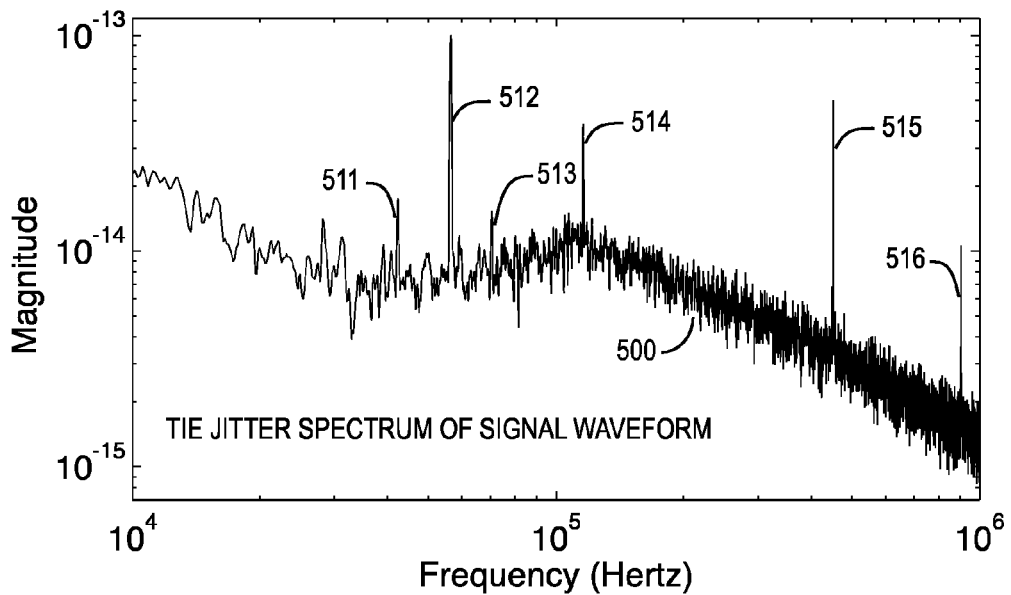
FIG. 5A depicts an example TIE jitter spectrum of a signal waveform in accordance with certain embodiments consistent with the present invention.
Figure 5B:
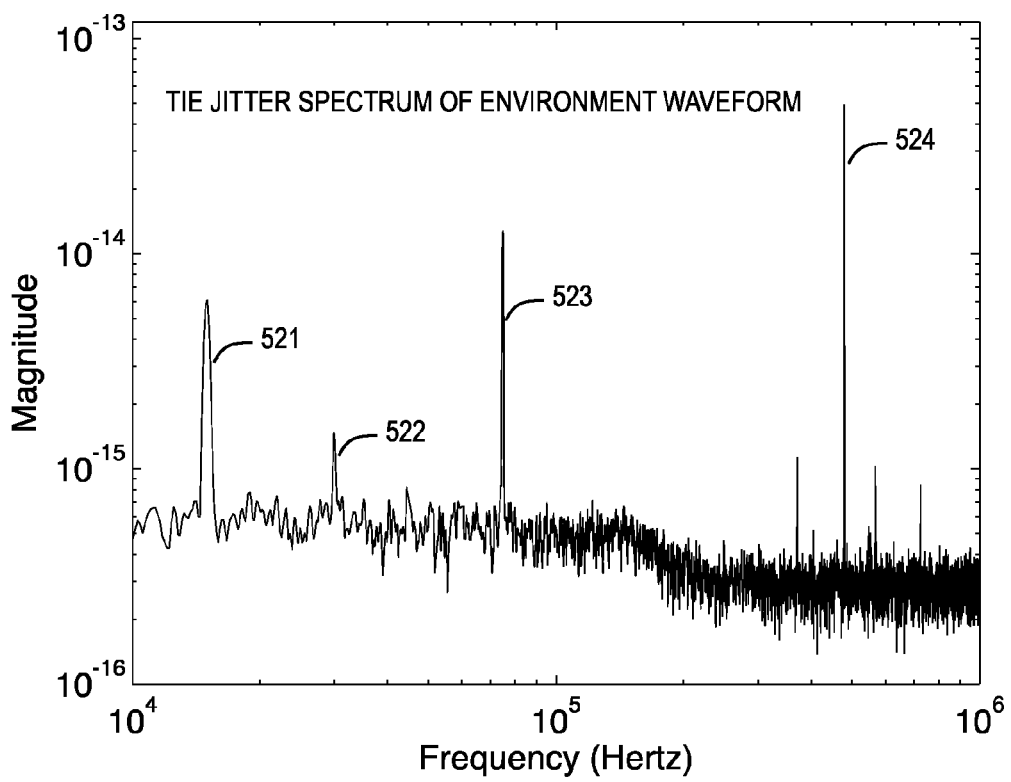
FIG. 5B depicts an example TIE jitter spectrum of an environment waveform in accordance with certain embodiments consistent with the present invention.

Example average-magnitude TIE jitter spectrums of the signal waveform 130 and the environment waveform 330 for a 625 MHz clock-timing signal SUT are illustrated in FIG. 5A and FIG. 5B, respectively. Using an average spectrum may reduce the likelihood of detecting a spur created by random phenomena. The spectrums illustrated in FIG. 5 are for a TIE jitter frequency range of 10 KHz to 1 MHz. Here, the one or more example signal spurs 345 are present with at least six distinct spurs shown in FIG. 5A, denoted as 511 to 516. These spurs appear as large spikes popping out of a random background noise spectrum, such as denoted by 500. The largest four spurs appearing in FIG. 5B are identified as 521 to 524.

Comparing the TIE jitter spectrums of FIG. 5A and FIG. 5B for the signal and environment waveforms, respectively, it may be noticed that the magnitude and frequency of spurs 523 and 513 seem to match, at least within some window of tolerance for both magnitude and frequency. A similar agreement exists for spurs 524 and 515. Assuming the sources of noise generating environment spurs 523 and 524 were present during measurement of the signal waveform 130, this suggests that signal spurs 513 and 515 are (at least partly) derived from noise in the measurement environment rather than from the electronic device 100 or SUT 110. The TIE jitter spectrum 340 of the signal waveform may therefore be modified to reduce the presence of spurs 513 and 515. A jitter analysis derived from such a modified spectrum may increase accuracy compared to a similar analysis based on the original spectrum. The reader should also note that the measured signal levels in general are extremely small, reinforcing the need for extreme care in measurement of such signals and noise to minimize error.

Figure 6:
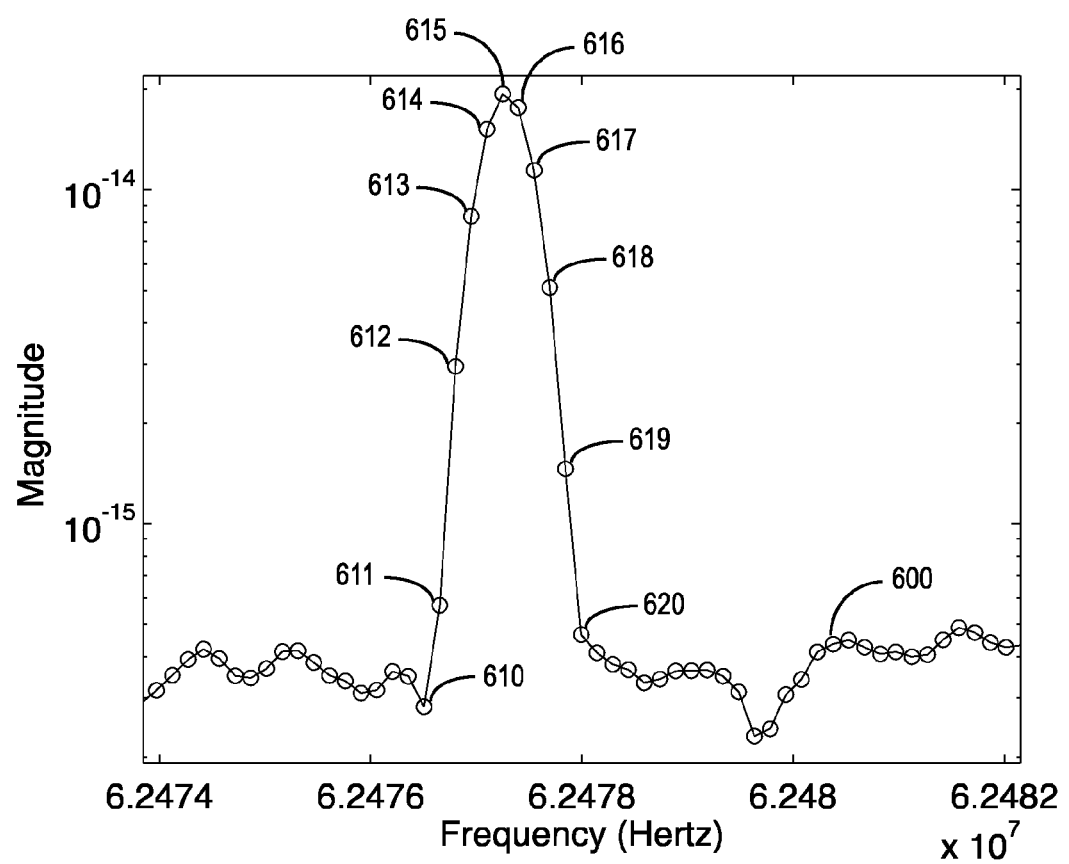
FIG. 6 depicts an example spur in accordance with certain embodiments consistent with the present invention.

FIG. 6 illustrates an example spur in a jitter spectrum 350 of an environment waveform in which the example spur has a peak height at frequency bin 615 (note that just as sampled time data may represent a signal at discrete points in time, the Fast Fourier Transform (FFT) may represent the spectrum of the signal at discrete frequencies often referred to as frequency bins, each frequency bin may be 1/(N*d) wide, where N is the number of time-domain samples collected and d is the time-domain sampling interval). The spur depicted in FIG. 6 rises clearly above a background noise floor, in which the background noise floor may have a magnitude approximately equal to the magnitude seen for frequency bin 600.

One way to reduce the presence of such a spur derived (at least in part) from a measurement artifact is to eliminate the spur. For example, the magnitude of frequency bins 610-620 can be reduced to equal or lower than the background noise magnitude set approximately by frequency bin 600. Alternatively, the phase and amplitude of the DFT coefficients corresponding to frequency bins 610-620 can be modified to reduce or eliminate the presence of this spur. Alternatively, the magnitude of the spur may be set to zero before subsequent processing. Note that the spur has been identified here as comprising bins 610-620, but other identifications are also possible, such as comprising bins 611-620.

In certain situations that process only spur-related frequency bin information, reducing the presence of a spur may simply be accomplished by not including in subsequent processing any frequency bin information (e.g. amplitude, phase, magnitude, spectral density, power, etc.) related to the spur. A threshold referenced to the signal spur may also be used, such that if the environment spur height exceeds this threshold, the spur is not included in subsequent processing (alternatively, if the environment spur is lower than this threshold, the spur is included in subsequent processing).

Other methods for reducing the presence of a signal spur are also possible.

Figure 7A:
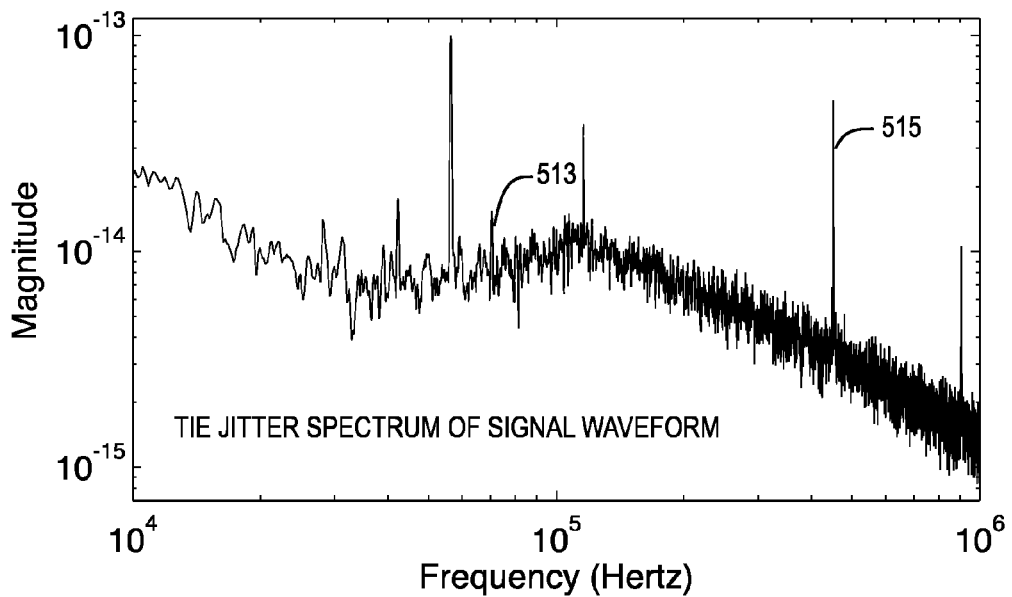
FIG. 7A depicts an example TIE jitter spectrum before being modified in accordance with certain embodiments consistent with the present invention.
Figure 7B:
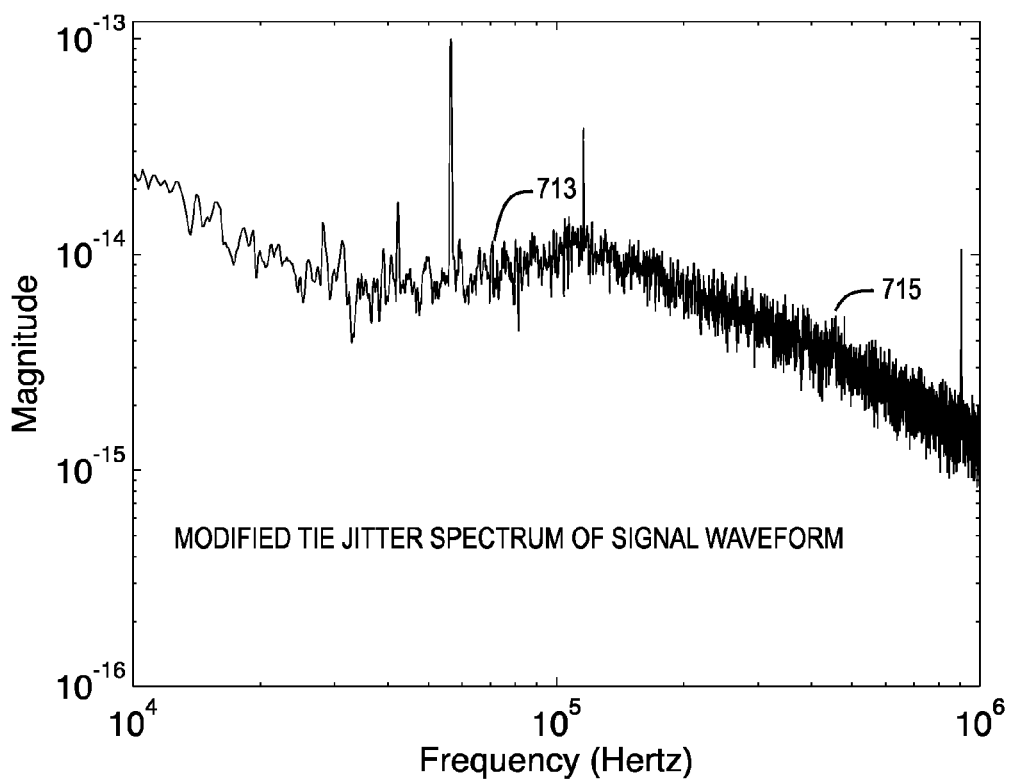
FIG. 7B depicts an example TIE jitter spectrum after being modified in accordance with certain embodiments consistent with the present invention.
Figure 8:
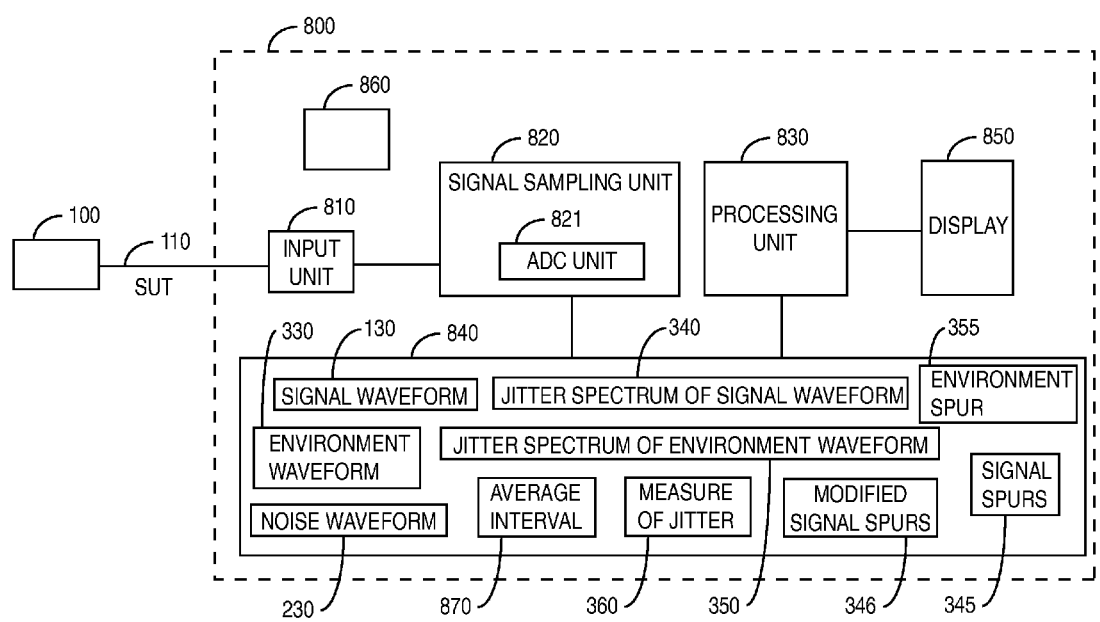
FIG. 8 is an example apparatus in accordance with certain embodiments consistent with the present invention.

FIG. 7 illustrates a scenario where the environment spurs identified above in the frequency domain are eliminated by setting the environment spur amplitude equal to the background noise level. For reference, the TIE jitter spectrum of the signal waveform shown in FIG. 5A is repeated in FIG. 7A. A modified TIE jitter spectrum of the signal waveform is shown in FIG. 7B, where the presence of spurs 513 and 515 have been reduced to appear as background noise 713 and 715, respectively.

Unlike the above scenario where the height of the environment spurs all equal the height of the signal spurs, within some margin or tolerance, other scenarios exist where the height of an environment spur 355 may be a fraction of the height of a corresponding spur in the jitter spectrum 340 of the signal waveform. In this case, it may be desirable (e.g. more accurate) to simply reduce the presence of this spur in the jitter spectrum 340 of the signal waveform by a fixed amount rather than completely eliminate it. This may be appropriate, for example, if the signal waveform contained a valid spur, such as from a harmonic (e.g. possibly verified using another test apparatus, such as a spectrum analyzer), at the same (or within some tolerance) jitter frequency that an environment spur 355 exists.

In this way the accuracy of a subsequent jitter analysis based on the modified one or more signal spurs 346 is thereby improved compared to a similar analysis on the original one or more signal spurs 345. For example, if a time-domain TIE deterministic jitter waveform is desired, an inverse discrete Fourier transform (IDFT) may be computed using DFT coefficients derived from the modified one or more signal spurs 346 rather than the one or more signal spurs 345. Other measures of jitter 360 derived from the modified one or more signal spurs 346 are also possible, including various spectrums, histograms, bit-error ratio (BER) bathtub curves, and measures of peak, peak-to-peak, or root-mean-square (RMS) quantities of jitter.

Summarizing the flow chart depicted in FIG. 3, one or more embodiments are based on using a real-time sampling oscilloscope 120 to acquire a signal waveform 130 representing a signal-under-test (SUT) 110, and using the real-time sampling oscilloscope 120 to acquire a noise waveform 230 representing noise measured by the real-time sampling oscilloscope 120 in the absence of the SUT 110. An environment waveform 330 is derived from the noise waveform 230 and the signal waveform 130; a jitter spectrum 350 is computed from the environment waveform 330; and an environment spur 355 is detected, where the environment spur 355 includes a spur in the jitter spectrum 350 of the environment waveform. A jitter spectrum 340 of the signal waveform 130 is computed; and one or more signal spurs 345 are detected, where the one or more signal spurs 345 include one or more spurs in the jitter spectrum 340 of the signal waveform. A measure of jitter 360 for the SUT 110 is then derived from the one or more signal spurs 346 after reducing the presence of at least one of the one or more signal spurs 345 in response to detecting the environment spur 355.

In other illustrative embodiments, a (time-domain) reference waveform 430 is generated from the signal waveform 130, where the (time-domain) environment waveform 330 is derived from a calculation resulting in adding the noise waveform 230 and the reference waveform 430 (e.g., environment waveform=reference waveform+noise waveform; or equivalent).

In one or more illustrative embodiments, the (time-domain) environment waveform 330 is derived from an average interval computed from the signal waveform 130. For example, the average interval may be the average duration of a bit of data in the signal waveform 130; or an average period or average half-period of a clock cycle in the signal waveform 130.

In at least one illustrative embodiment, the SUT 110 is a clock timing signal, as discussed above.

In certain illustrative embodiments, an input channel 121 of the real-time sampling oscilloscope 120 is terminated 200 to reduce electrical reflections, and the noise waveform 230 is acquired from the terminated input channel 121 of the real-time sampling oscilloscope 120.

Certain other illustrative embodiments relate to an apparatus 800 having an input unit 810 including at least one input that receives the SUT 110. The at least one input may be a standard or custom electrical or optical connector, or a physical probe. The apparatus 800 includes a signal-sampling unit 820 that receives the SUT 110 from the input unit 810. The signal-sampling unit 820 samples the SUT 110 to acquire a signal waveform 130. The signal waveform 130 includes a plurality of samples, each sample representing an amplitude of the SUT 110 at a corresponding sample time. The apparatus 800 also includes at least one processing unit 830 that receives the signal waveform 130, and receives a noise waveform 230 representing noise measured by the signal-sampling unit 820 in the absence of the SUT 110. The at least one processing unit 830 operates to compute the following (as discussed above and in relation to FIGS. 1 to 7): an environment waveform 330 derived from the noise waveform 230 and the signal waveform 130; a jitter spectrum 350 of the environment waveform; a detection of an environment spur 355, where the environment spur 355 includes a spur in the jitter spectrum 350 of the environment waveform; a jitter spectrum 130 of the signal waveform; a detection of one or more signal spurs 345, where the one or more signal spurs 345 are one or more spurs in the jitter spectrum 340 of the signal waveform; and a measure 360 of jitter for the SUT 110 derived from the one or more signal spurs 346 after reducing the presence of at least one of the one or more signal spurs in response to detecting the environment spur 355.

The apparatus 800 also includes at least one memory 840 connected to the at least one processing unit 830 (i.e., one or more programmed processors or computers or controller or hard wired processing devices) and/or other blocks with sufficient storage for the at least one processing unit 830 to perform its operations (as described in the previous paragraph). Operating memory 860 may also be available to the at least one processing unit 830 and/or other blocks. Any of the memories mentioned above may include any type of memory used to store digital data, including but not limited to random access memory (RAM), magnetic, optical, hard drive, SRAM, DRAM, EPROM, EEPROM, flash or other volatile or non-volatile memory.

The apparatus 800 may also include a display 850 to provide information, such as the measure of jitter 360, to a user.

In one or more illustrative embodiments, the real-time sampling oscilloscope 120 or the signal sampling unit 820 may include an analog-to-digital converter (ADC) unit 821, and the noise waveform 230 is acquired by the real-time sampling oscilloscope 120 or the signal sampling unit 820 using the same sampling rate and ADC-unit voltage resolution used for acquiring the signal waveform 130. The sampling rate, or sampling frequency, of the ADC-unit may be described as the rate that new digital values are sampled from the signal, or SUT 110. The ADC-unit voltage resolution may be expressed in volts as the full-scale voltage measurement range divided by the number of discrete voltage intervals.

Figure 9:
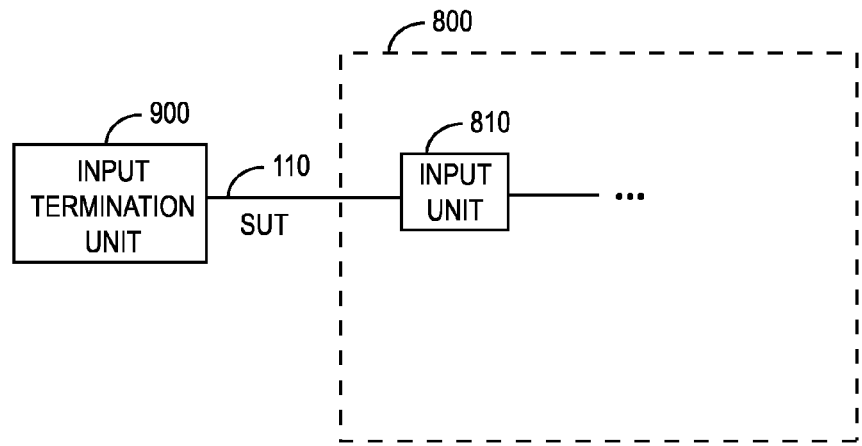
FIG. 9 is an example apparatus with termination in accordance with certain embodiments consistent with the present invention.
Figure 10:
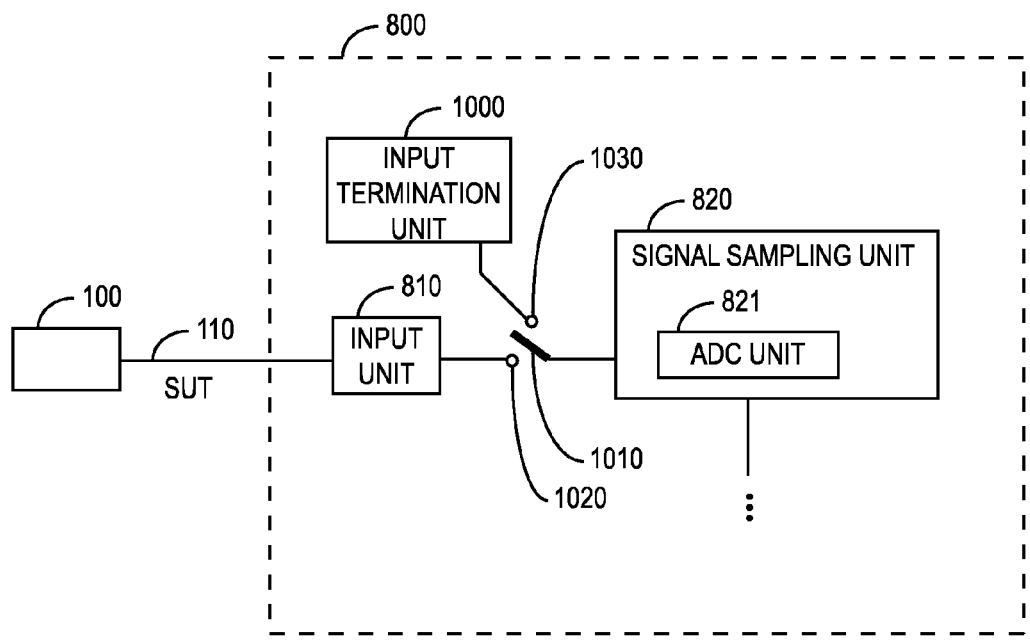
FIG. 10 is an example apparatus with internal termination in accordance with certain embodiments consistent with the present invention.

As depicted in FIG. 9, at least one illustrative embodiment is based on the apparatus 800 further has an input-termination unit 900 that optionally connects to the input unit 810. As depicted in FIG. 10, at least another illustrative embodiment is based on the apparatus 800 further has an input-termination unit 1000 that optionally connects to the signal-sampling unit 820 to terminate an input of the signal-sampling unit. The signal-sampling unit 820 acquires the noise waveform 230 from the terminated input of the signal-sampling unit 820.

The input termination unit may be attached to the apparatus 800 externally as illustrated in FIG. 9, or connected to the signal sampling unit 820 using a switch 1010 to connect (position 1030) and disconnect (position 1020, which connects the input unit 810 to the signal sampling unit 820) the input termination unit 1000 to/from the signal sampling unit 820 as illustrated in FIG. 10.

As discussed above for the terminator 200, the input termination unit 900 or 1000 may be used to match the apparatus 800 impedance (for example, 50 Ohms) looking into the input unit 810 or signal sampling unit 820 (depending on the implementation), to reduce signal reflections. The input termination unit 900 or 1000 may be passive such as a simple resistor. The input termination unit 900 or 1000 may be active such as a voltage regulator that keeps the voltage across one or more terminating resistors constant. The input termination unit 900 or 1000 may be electrical ground. Other input termination unit 900 or 1000 configurations are also possible.

In at least one illustrative embodiment, the at least one processing unit 830 derives the environment waveform 330 from an average interval 870 computed from the signal waveform 130. As described above, the average interval 870 may be, for example, the average duration of a bit of data in the signal waveform 130; or an average period or average half-period of a clock cycle in the signal waveform 130.

In certain illustrative embodiments, the jitter spectrum 340 of the signal waveform includes a time-interval error (TIE) jitter spectrum of the signal waveform, and the jitter spectrum 350 of the environment waveform includes a TIE jitter spectrum of the environment waveform. Other types of jitter spectrums are also possible.

Those of ordinary skill in the art will recognize upon consideration of the present teachings that one or more of the example embodiments can be accomplished using any form of storage or computer-readable medium, including but not limited to distribution media, intermediate storage media, execution memory of a computer, computer-readable storage device, and any other medium or device or non-transitory storage capable of storing for later reading by a computer program implementing one or more embodiments. Those of ordinary skill in the art will appreciate that the methods described above can be implemented in any number of variations, including adding or deleting certain actions, without departing from the scope of one or more of the embodiments.

Those of ordinary skill in the art will recognize upon consideration of the present teachings that the methods and associated data used to implement one or more embodiments can be implemented using disc storage or other forms of storage, including but not limited to Read Only Memory (ROM) devices, Random Access Memory (RAM) devices, optical storage elements, magnetic storage elements, magneto-optical storage elements, flash memory, core memory and/or other equivalent storage technologies.

Special-purpose hardware dedicated to performing the functions described herein may also be implemented. Further implementations may include software residing on a general-purpose computer, or a standalone computer that receives files or other data, and provides off-line analysis.

Those of ordinary skill in the art will recognize that one or more embodiments may be implemented using hardware components such as special-purpose hardware and/or dedicated processors, which are within the scope and spirit of the above description and in the appended claims. Similarly, custom circuits, microprocessors, general purpose computers, microprocessor based computers, microcontrollers, ASICs, and/or other dedicated hard wired logic may be used to construct alternative equivalent embodiments. Hence, the term "one or more programmed processors" should be interpreted to mean a device that is programmed or designed as a dedicated hardware device to carry out a programmed function.

Since certain changes may be made in the foregoing disclosure without departing from the scope of the embodiments herein involved, it is intended that all matter contained in the above description and depicted in the accompanying drawings be construed in an illustrative and not in a limiting sense.

Certain embodiments may be implemented using a programmed processor executing programming instructions that in certain instances are broadly described above in flow chart form that can be stored on any suitable electronic or computer readable storage medium such as a non-transitory storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). The term "non-transitory" is intended only to exclude propagating waves and signals, but is not intended to exclude volatile storage technologies or re-writable or erasable storage technologies. Those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While the above description contains many specificities, these should not be construed as limitations on the scope, but rather as an exemplification of one or more preferred embodiments thereof. Many other variations are possible. Accordingly, the scope should be determined not by the embodiments illustrated, but by the appended claims and their legal equivalents. While certain illustrative embodiments have been described, it is evident that many alternatives, modifications, permutations and variations will become apparent to those skilled in the art in light of the foregoing description.

Thus, in accord with certain illustrative embodiments, a method is based on using a real-time sampling oscilloscope to acquire a signal waveform 130 representing a signal-under-test (SUT) 110, and using the real-time sampling oscilloscope to acquire a noise waveform 230 representing noise measured by the real-time sampling oscilloscope in the absence of the SUT 110. An environment waveform 330 is derived from the noise waveform 230 and the signal waveform 130, and a jitter spectrum of the environment waveform 350 is computed. An environment spur 355 is detected, where the environment spur 355 comprises a spur in the jitter spectrum of the environment waveform 350. A jitter spectrum of the signal waveform 340 is computed. One or more signal spurs 345 is detected, where the one or more signal spurs 345 comprise one or more spurs in the jitter spectrum of the signal waveform 340. A measure of jitter 360 for the SUT 110 is derived from the one or more signal spurs 345 after reducing the presence of at least one of the one or more signal spurs 345 in response to detecting the environment spur 355.

In certain illustrative embodiments, the jitter spectrum of the signal waveform 340 has a time-interval error (TIE) jitter spectrum of the signal waveform, and the jitter spectrum of the environment waveform 350 comprises a TIE jitter spectrum of the environment waveform.

In one or more illustrative embodiments, the method further involves generating a reference waveform 430 from the signal waveform 130, and the environment waveform 330 is derived from a calculation resulting in adding the noise waveform 230 and the reference waveform 430.

In certain illustrative embodiments, the environment waveform 330 is derived from an average interval computed from the signal waveform 130.

In at least one illustrative embodiment, the SUT 110 includes a clock timing signal.

In accord with certain embodiments, the method further involves terminating an input channel 121 of the real-time sampling oscilloscope to reduce electrical reflections; and acquiring the noise waveform 230 from the terminated input channel of the real-time sampling oscilloscope.

In certain implementations, the environment waveform 330 is derived from an average interval computed from the signal waveform 130. In other implementations, the jitter spectrum of the signal waveform 340 comprises a time-interval error (TIE) jitter spectrum of the signal waveform, and the jitter spectrum of the environment waveform 350 includes a TIE jitter spectrum of the environment waveform. In one or more implementations, the real-time sampling oscilloscope comprises an analog-to-digital converter (ADC) unit, and the noise waveform 230 is acquired by the real-time sampling oscilloscope using the same sampling rate and ADC-unit voltage resolution used for acquiring the signal waveform 130. In certain implementations, the SUT 110 comprises a clock timing signal.

In accord with certain embodiments, one or more tangible non-transitory computer-readable storage devices containing programming instructions that when carried out on one or more programmed processors carry out a process, where the programming instructions include: instructions for receiving a signal waveform 130 representing a signal-under-test (SUT) 110 that comprises a first plurality of samples in which each sample represents an amplitude of the SUT at a corresponding sample time; instructions for receiving a noise waveform 230 representing noise in the absence of the SUT 110 that comprises a second plurality of samples in which each sample represents an amplitude of the noise at a corresponding sample time; instructions for deriving an environment waveform 330 from the noise waveform 230 and the signal waveform 130; instructions for computing a jitter spectrum of the environment waveform 350; instructions for detecting an environment spur 355, where the environment spur 355 comprises a spur in the jitter spectrum of the environment waveform; instructions for computing a jitter spectrum of the signal waveform 340; instructions for detecting one or more signal spurs 345, where the one or more signal spurs 345 comprise one or more spurs in the jitter spectrum of the signal waveform; and instructions for deriving a measure of jitter 360 for the SUT 110 from the one or more signal spurs 345 after reducing the presence of at least one of the one or more signal spurs 345 in response to detecting the environment spur 355.

In certain implementations of the one or more computer-readable storage devices, the jitter spectrum of the signal waveform 340 includes a TIE jitter spectrum of the signal waveform, and the jitter spectrum of the environment waveform 350 comprises a TIE jitter spectrum of the environment waveform.

In certain implementations of the one or more computer-readable storage devices, the instructions for deriving the environment waveform 330 include: instructions for computing an average interval from the signal waveform 130; and instructions for deriving the environment waveform 330 from the average interval.

In certain implementations of the one or more computer-readable storage devices, the SUT 110 includes a clock timing signal.

In certain implementations of the one or more computer-readable storage devices, the programming instructions are carried out on one or more processors forming a part of a real-time sampling oscilloscope. In at least one implementation of the one or more computer-readable storage devices, the instructions further include: instructions for terminating an input channel 121 of the real-time sampling oscilloscope; and instructions for acquiring the noise waveform 230 from the terminated input channel of the real-time sampling oscilloscope.

In certain illustrative embodiments, an apparatus 800 includes: an input unit 810 comprising at least one input that receives a signal-under-test (SUT) 110; a signal-sampling unit 820 receiving the SUT 110 from the input unit 810 that samples the SUT 110 to acquire a signal waveform 130 that comprises a plurality of samples, each sample representing an amplitude of the SUT 110 at a corresponding sample time; at least one processing unit 830 that receives the signal waveform 130, and receives a noise waveform 230 representing noise measured by the signal-sampling unit 820 in the absence of the SUT 110, where the at least one processing unit 830 operates to compute the following: an environment waveform 330 derived from the noise waveform 230 and the signal waveform 130; a jitter spectrum of the environment waveform 350; a detection of an environment spur 355, where the environment spur 355 comprises a spur in the jitter spectrum of the environment waveform 350; a jitter spectrum of the signal waveform 340; a detection of one or more signal spurs 345, where the one or more signal spurs 345 comprise one or more spurs in the jitter spectrum of the signal waveform 340; and a measure of jitter 360 for the SUT 110 derived from the one or more signal spurs 345 after reducing the presence of at least one of the one or more signal spurs 345 in response to detecting the environment spur 355; and at least one memory 840 connected to the at least one processing unit 830 with sufficient storage for the at least one processing unit 830 to perform its operations.

In certain implementations, the at least one processing unit 830 derives the environment waveform 330 from an average interval computed from the signal waveform 130.

In one or more illustrative embodiments, the apparatus 800 further has an input-termination unit 1000 that optionally connects to the signal-sampling unit 820 to terminate an input of the signal-sampling unit 820; and the signal-sampling unit 820 acquires the noise waveform 230 from the terminated input of the signal-sampling unit 820.

In certain implementations of the apparatus 800, the jitter spectrum of the signal waveform 340 has a time-interval error (TIE) jitter spectrum of the signal waveform, and the jitter spectrum of the environment waveform 350 comprises a TIE jitter spectrum of the environment waveform.

In certain implementations of the apparatus 800, the at least one processing unit 830 derives the environment waveform 330 from an average interval computed from the signal waveform 130.

In certain implementations of the apparatus 800, the signal-sampling unit 820 has an analog-to-digital converter (ADC) unit 821, and the noise waveform 230 is acquired by the signal-sampling unit 820 using the same sampling rate and ADC-unit voltage resolution used for acquiring the signal waveform 130.

What is claimed is:

1. A method, comprising:
    using a real-time sampling oscilloscope to acquire a signal waveform representing a signal-under-test (SUT);
    using the real-time sampling oscilloscope to acquire a noise waveform representing noise measured by the real-time sampling oscilloscope in the absence of the SUT;
    deriving an environment waveform from the noise waveform and the signal waveform;
    computing a jitter spectrum of the environment waveform;
    detecting an environment spur, where the environment spur comprises a spur in the jitter spectrum of the environment waveform;
    computing a jitter spectrum of the signal waveform;
    detecting one or more signal spurs, where the one or more signal spurs comprise one or more spurs in the jitter spectrum of the signal waveform; and
    deriving a measure of jitter for the SUT from the one or more signal spurs after reducing the presence of at least one of the one or more signal spurs in response to detecting the environment spur.

2. The method of claim 1, where the jitter spectrum of the signal waveform comprises a time-interval error (TIE) jitter spectrum of the signal waveform, and where the jitter spectrum of the environment waveform comprises a TIE jitter spectrum of the environment waveform.

3. The method of claim 2, where the environment waveform is derived from an average interval computed from the signal waveform.

4. The method of claim 3, where the SUT comprises a clock timing signal.

5. The method of claim 1, and the method further comprising:
    terminating an input channel of the real-time sampling oscilloscope to reduce electrical reflections; and
    acquiring the noise waveform from the terminated input channel of the real-time sampling oscilloscope.

6. The method of claim 5, where the environment waveform is derived from an average interval computed from the signal waveform.

7. The method of claim 6, where the jitter spectrum of the signal waveform comprises a time-interval error (TIE) jitter spectrum of the signal waveform, and where the jitter spectrum of the environment waveform comprises a TIE jitter spectrum of the environment waveform.

8. The method of claim 7, where the real-time sampling oscilloscope comprises an analog-to-digital converter (ADC) unit, and where the noise waveform is acquired by the real-time sampling oscilloscope using the same sampling rate and ADC-unit voltage resolution used for acquiring the signal waveform.

9. The method of claim 8, where the SUT comprises a clock timing signal.

10. The method of claim 1, where the SUT is derived from an electronic device, and where the noise comprises noise derived from the electronic device.

11. One or more tangible non-transitory computer-readable storage devices containing programming instructions that when carried out on one or more programmed processors carry out a process, where the programming instructions comprise:

instructions for receiving a signal waveform representing a signal-under-test (SUT) that comprises a first plurality of samples in which each sample represents an amplitude of the SUT at a corresponding sample time;

instructions for receiving a noise waveform representing noise in the absence of the SUT that comprises a second plurality of samples in which each sample represents an amplitude of the noise at a corresponding sample time;

instructions for deriving an environment waveform from the noise waveform and the signal waveform;

instructions for computing a jitter spectrum of the environment waveform;

instructions for detecting an environment spur, where the environment spur comprises a spur in the jitter spectrum of the environment waveform;

instructions for computing a jitter spectrum of the signal waveform;

instructions for detecting one or more signal spurs, where the one or more signal spurs comprise one or more spurs in the jitter spectrum of the signal waveform; and instructions for deriving a measure of jitter for the SUT from the one or more signal spurs after reducing the presence of at least one of the one or more signal spurs in response to detecting the environment spur.

12. The one or more computer-readable storage devices of claim 11, where the jitter spectrum of the signal waveform comprises a time-interval error (TIE) jitter spectrum of the signal waveform, and where the jitter spectrum of the environment waveform comprises a TIE jitter spectrum of the environment waveform.

13. The one or more computer-readable storage devices of claim 12, where the instructions for deriving the environment waveform comprise:

instructions for computing an average interval from the signal waveform; and instructions for deriving the environment waveform from the average interval.

14. The one or more computer-readable storage devices of claim 12, where the SUT comprises a clock timing signal.

15. The one or more computer-readable storage devices according to claim 11, where the programming instructions are carried out on one or more processors forming a part of a real-time sampling oscilloscope.

16. The one or more computer-readable storage devices of claim 15, and the instructions further comprise:

instructions for terminating an input channel of the real-time sampling oscilloscope; and instructions for acquiring the noise waveform from the terminated input channel of the real-time sampling oscilloscope.

17. An apparatus, comprising:

an input unit comprising at least one input that receives a signal-under-test (SUT);

a signal-sampling unit receiving the SUT from the input unit that samples the SUT to acquire a signal waveform that comprises a plurality of samples, each sample representing an amplitude of the SUT at a corresponding sample time;

at least one processing unit that receives the signal waveform, and receives a noise waveform representing noise measured by the signal-sampling unit in the absence of the SUT, where the at least one processing unit operates to compute the following:

an environment waveform derived from the noise waveform and the signal waveform;

a jitter spectrum of the environment waveform;

a detection of an environment spur, where the environment spur comprises a spur in the jitter spectrum of the environment waveform;

a jitter spectrum of the signal waveform;

a detection of one or more signal spurs, where the one or more signal spurs comprise one or more spurs in the jitter spectrum of the signal waveform; and a measure of jitter for the SUT derived from the one or more signal spurs after reducing the presence of at least one of the one or more signal spurs in response to detecting the environment spur; and at least one memory connected to the at least one processing unit with sufficient storage for the at least one processing unit to perform its operations.

18. The apparatus of claim 17, where the at least one processing unit derives the environment waveform from an average interval computed from the signal waveform.

19. The apparatus of claim 17, and the apparatus further comprising:

an input-termination unit that optionally connects to the signal-sampling unit to terminate an input of the signal-sampling unit;

where the signal-sampling unit acquires the noise waveform from the terminated input of the signal-sampling unit.

20. The apparatus of claim 19, where the jitter spectrum of the signal waveform comprises a time-interval error (TIE) jitter spectrum of the signal waveform, and where the jitter spectrum of the environment waveform comprises a TIE jitter spectrum of the environment waveform.

21. The apparatus of claim 20, where the at least one processing unit derives the environment waveform from an average interval computed from the signal waveform.

22. The apparatus of claim 21, where the signal-sampling unit comprises an analog-to-digital converter (ADC) unit, and the noise waveform is acquired by the signal-sampling unit using the same sampling rate and ADC-unit voltage resolution used for acquiring the signal waveform.

23. A method, comprising:

using a real-time sampling oscilloscope to acquire a signal waveform representing a signal-under-test (SUT);

using the real-time sampling oscilloscope to acquire a noise waveform representing noise measured by the real-time sampling oscilloscope in the absence of the SUT;

deriving an environment waveform from the noise waveform and the signal waveform;

computing a jitter spectrum of the environment waveform;

detecting an environment spur, where the environment spur comprises a spur in the jitter spectrum of the environment waveform;

computing a jitter spectrum of the signal waveform;

where the jitter spectrum of the signal waveform comprises a time-interval error (TIE) jitter spectrum of the signal waveform, and where the jitter spectrum of the environment waveform comprises a TIE jitter spectrum of the environment waveform;

detecting one or more signal spurs, where the one or more signal spurs comprise one or more spurs in the jitter spectrum of the signal waveform;

deriving a measure of jitter for the SUT from the one or more signal spurs after reducing the presence of at least one of the one or more signal spurs in response to detecting the environment spur; and generating a reference waveform from the signal waveform, where the environment waveform is derived from a calculation resulting in adding the noise waveform and the reference waveform.

* * * * *